United States Patent
Carvallo et al.

(10) Patent No.: US 6,238,724 B1
(45) Date of Patent: May 29, 2001

(54) CHOCOLATE REFINING PROCESS

(75) Inventors: Federico de Loyola Carvallo, Arlington Heights, IL (US); William Scott Hine, McMahons Point (AU); Andreas Valentin Helmreich, Aying (DE)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/420,933

(22) Filed: Oct. 19, 1999

Related U.S. Application Data

(60) Provisional application No. 60/106,148, filed on Oct. 29, 1998.

(51) Int. Cl.$^7$ ..................................................... A23G 1/00
(52) U.S. Cl. ......................... 426/631; 426/518; 426/660
(58) Field of Search ................................... 426/631, 660, 426/518

(56) References Cited

U.S. PATENT DOCUMENTS

| | | | |
|---|---|---|---|
| 3,357,836 | | 12/1967 | Beetz ............................... 99/23 |
| 3,709,442 | * | 1/1973 | Consoli ............................ 241/65 |
| 3,764,079 | * | 10/1973 | Consoli .......................... 241/110 |
| 3,840,190 | * | 10/1974 | Consoli .......................... 241/117 |
| 4,042,721 | | 8/1977 | Ziccarelli ....................... 426/613 |
| 4,151,308 | | 4/1979 | Ziccarelli et al. ............. 426/613 |
| 4,224,354 | * | 9/1980 | Szegvari ......................... 426/584 |
| 4,440,797 | | 4/1984 | Berkes et al. .................. 426/613 |
| 4,519,304 | * | 5/1985 | Ripani ............................. 99/489 |
| 4,603,815 | * | 8/1986 | Ripani ............................. 241/36 |
| 4,635,861 | * | 9/1980 | Resch ............................. 241/37 |
| 4,713,256 | * | 12/1987 | Chaveron ..................... 426/631 |
| 4,746,070 | * | 5/1988 | Kuster ............................. 241/37 |
| 4,859,482 | * | 8/1989 | Gavin ............................ 425/518 |
| 4,861,615 | | 8/1989 | Wiedmann ..................... 426/660 |
| 4,878,426 | * | 11/1989 | Tadema ........................... 99/485 |
| 5,079,027 | * | 1/1992 | Wong ............................ 426/663 |
| 5,156,867 | | 10/1992 | Leuthold et al. ............. 426/231 |
| 5,156,878 | * | 10/1992 | Tadema ........................ 426/631 |
| 5,197,680 | * | 3/1993 | Chauveau ...................... 241/57 |
| 5,200,220 | | 4/1993 | Capodieci ..................... 426/231 |
| 5,297,743 | * | 3/1994 | Tadema ........................... 241/80 |
| 5,379,950 | * | 1/1995 | Kuster ............................. 241/30 |
| 5,554,409 | | 9/1996 | Vezzani ........................ 426/631 |
| 5,676,995 | * | 10/1997 | Cully ............................ 426/660 |
| 5,882,709 | * | 3/1999 | Zumbe .......................... 426/481 |

OTHER PUBLICATIONS

Beckett (ed) 1994 Industrial Chocolate Manufacture and Use Blackie Academic & Professional New York pp. 83–101 and 139–155.*

Minifie 1980 Chocolate Cocoa and Confectionary Science and Technology 2nd Edition AVI Publishing Co. Inc WestPort CT.*

Grant (ed) 1993 Kirk–Othmer Encyclopedia of Chemical Technology 4$^{th}$ ed. Wiley Interscience Publication New York, vol. 6, p. 177, 179, 183, 184, 188, 189; vol. 16, p. 16; vol. 21, p 347–348; vol. 22, p 279–286.*

Considine (ed) 1974 Chemical and Procss Technology Encyclopedia McGraw–Hill Book Co., New York p 1038–1043.*

Perry (ed) 1984 Perry's Chemical Engineers Handbook 6$^{th}$ ed. McGraw–Hill, New York p 8–9 to 8–20.*

* cited by examiner

*Primary Examiner*—Carolyn Paden
(74) *Attorney, Agent, or Firm*—Fitch, Even, Tabin & Flannery

(57) ABSTRACT

An improved chocolate manufacturing and/or refining process is provided. This process allows chocolate refining at a significantly increased throughput rate while maintaining the particle size distribution at the desired level. Thus, the production rates of existing or newly designed chocolate-making processes can be increased significantly. High shear is applied to the chocolate mass during the later stages of refining and before conching. Generally, this high shear is in the range of about 200,000 to about 1,000,000 sec$^{-1}$. By significantly increasing the shear rate in the later stages of the refining process, the throughput of refining process, and thus the overall chocolate manufacturing process, can be significantly increased without significantly increasing the particle size of the chocolate mass entering the conching step.

12 Claims, 3 Drawing Sheets

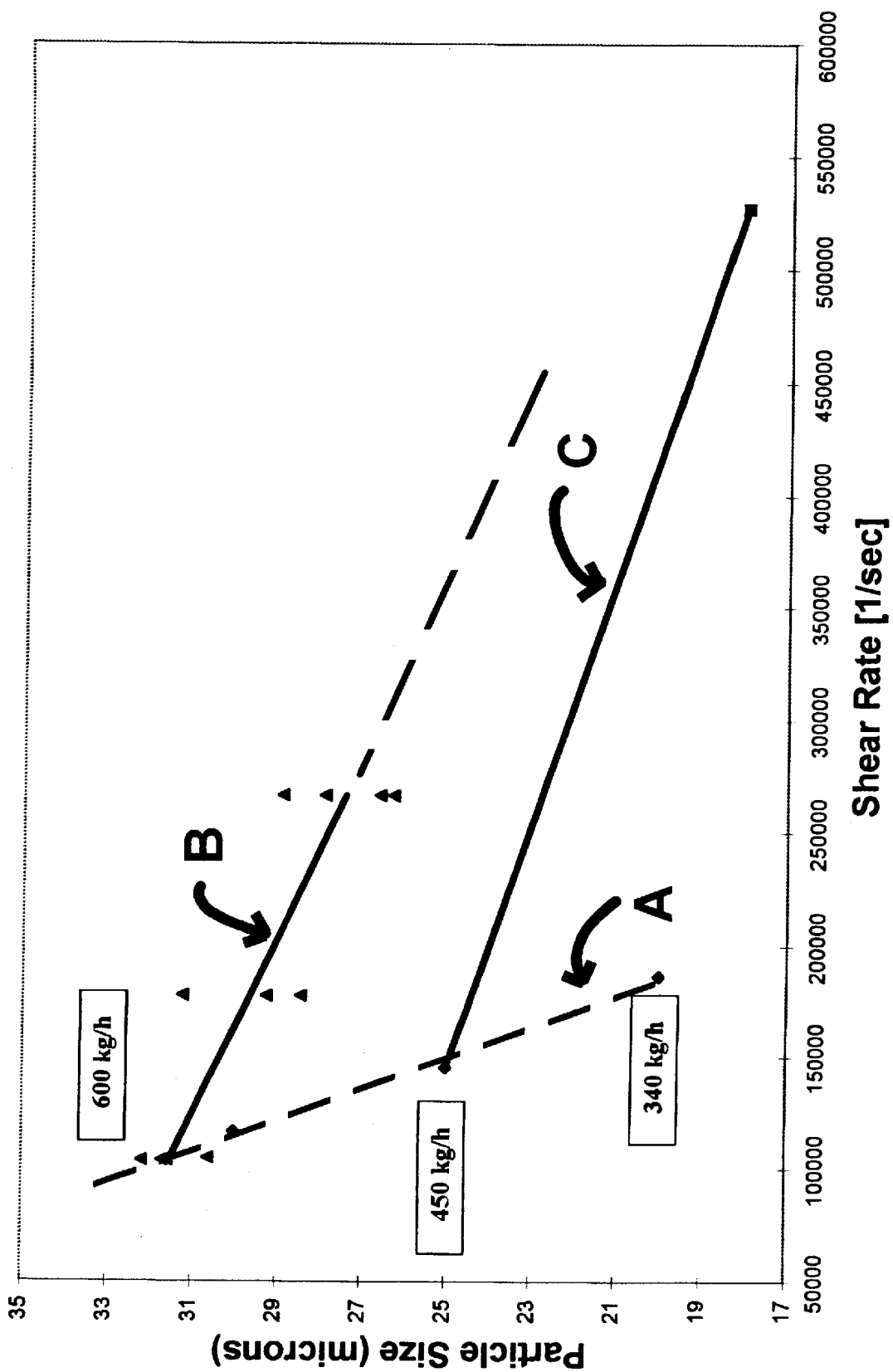

CHOCOLATE REFINING PROCESS

RELATED APPLICATIONS

This application is based on, and claims benefit of U.S. Provisional Patent Application Ser. No. 60/106,148, filed on Oct. 29, 1998.

FIELD OF THE INVENTION

The present invention is directed to an improved chocolate refining process. More particularly, the present invention is directed to a process which allows chocolate refining at a significantly increased throughput rate while maintaining the particle size distribution at the desired level. Thus, using the methods of this invention, the production rates of existing or newly designed chocolate-making processes can be increased significantly. As used herein, the term chocolate means confectionery masses containing cocoa butter and/or other vegetable fats.

BACKGROUND OF THE INVENTION

The essential components of a conventional chocolate formulation are cocoa "nib" (i.e., the roasted cocoa bean with shell and germ removed), sugar, and cocoa butter in addition to the cocoa butter contained in the nib. Cocoa nib is approximately 50% cocoa butter, the balance being proteins, carbohydrates, tannins, acids, and the like. The cocoa butter content of the chocolate controls its setting characteristics and largely governs its cost. While the ratio of cocoa nib to sugar determines the type of chocolate, the cocoa butter content varies according to the application. Thus, bitter sweet chocolate has a nib to sugar ratio of about 2 to 1 while sweet chocolate has a ratio of about 1 to 2. Molding chocolate may have a fat content of about 25% to 40%, covering chocolate about 33 to 36%, chocolate for hollow goods about 38 to 40%, and chocolate for covering ice cream about 50 to 60%.

The typical preparation of chocolate involves four general operations or steps. In the first operator, the ingredients are mixed together in a process which also involves grinding or rubbing (e.g., on a multiple roll press) to provide a smooth fluid paste of uniform and specific particle size. The ingredients may be added sequentially and/or, in particular the cocoa butter, may be added stepwise to help control the viscosity of the composition. The sugar may also be pre-ground to a smaller particle size to reduce the length of time required in the grinding/rubbing (i.e., refining) of the chocolate mixture. Most chocolate, and certainly all good quality chocolate, is subjected after refining or mixing to the process of "conching" in which the chocolate mixture is subjected to temperature treatment and mechanical working to give the chocolate an improved texture and a fuller and more homogeneous flavor. Other ingredients such as flavors (e.g., vanilla and extra cocoa butter) may be added during this operation, if desired. A frequently added additional ingredient is lecithin or other emulsifiers which improves the flow properties of the chocolate and thereby enables the amount of fat to be reduced. The third operation of the chocolate preparation is called "tempering" in which nuclei are provided in the liquid chocolate composition to facilitate the rapid crystallization of selected stable fat crystals on cooling. The final appearance of the chocolate, its texture and keeping properties depend upon correct tempering conditions. After tempering, the chocolate may finally be cast into molds to set or may be used in an enrobing process to produce the desired chocolate products.

The present invention is concerned in particular with the first operation (i.e., the refining step) of the chocolate-making process. The refining step or process is often the limiting or bottleneck portion of the entire chocolate-making process. Generally, the refining step is carried out using one or more three- or five-roll presses to obtain a smooth fluid paste of uniform and specific particle size (generally about 15 to 50 microns in diameter with a relatively narrowly particle size distribution). Attempts to speed up the refining process, while still maintaining the desired particle size profile, have generally been unsuccessful. In most cases, simply speeding up the process does not allow the desired particle size profile to be maintained and will result in a larger than desired average particle size material going into the conching process and in the final product.

It would be desirable, therefore, to provide a method for increasing the flowrate in the refining process without significantly increasing the average particle size or particle size distribution of the refined chocolate mass. It would also be desirable to provide such a method which could be utilized on existing multiple roll press chocolate refining equipment. It would also be desirable to provide such a method which could be even more effectively utilized on newly designed chocolate refining equipment. The methods of the present invention are able to provide such advantages to both existing and newly designed chocolate-making processes.

SUMMARY OF THE INVENTION

The present invention is directed to an improved chocolate refining process. More particularly, the present invention is directed to a process which allows chocolate refining at a significantly increased throughput rate while maintaining the particle size distribution at the desired level. Thus, using the methods of this invention, the production rates of existing or newly designed chocolate-making processes can be increased significantly.

In the present invention, high shear is applied to the chocolate mass during the later stages of refining and before conching. Generally, this high shear is in the range of about 200,000 to about 1,000,000 $\sec^{-1}$, preferably in the range of about 250,000 to about 700,000 $\sec^{-1}$, and most preferably in the range of about 300,000 to about 600,000 $\sec^{-1}$. For existing chocolate-making process lines, this high shear is most conveniently, and preferably, applied between the second-to-last and the last roller in the multiple roll refiner. Thus, for example, the gears and/or operating conditions of a five-roll refiner could be adjusted so that much of the required high shear is applied between the fourth and fifth rollers. Although such a modified multiple-roll system could be used in newly designed and/or constructed facilities, it may be preferable in such new installations to add an additional stage or step between the refining and conching steps specifically for applying the high shear to the chocolate mixture. Of course, if desired, such an additional stage or step could be added to an existing chocolate-making process. By significantly increasing the shear rate in the later stages of the refining process, the throughput of refining process, and thus the overall process, can be significantly increased without significantly increasing the particle size of the chocolate mass entering the conching step.

It is, therefore, one object of the present invention to provide an improved chocolate-making process. It is another object of the present invention to provide a chocolate-making process whereby the throughput of the process can be significantly increased without adversely effecting the quality of the resulting chocolate product. Still another object of the present invention is to provide a method for making chocolate, said method comprising: (a) providing a chocolate mixture comprising a chocolate source selected from the group consisting of cocoa powder and chocolate liquor, a fat source selected from the group consisting of cocoa butter and a vegetable fat, and a sweetener; (b) refining the chocolate mixture to obtain a particle size distribution such that at least about 90 volume percent of the particles of the chocolate mixture are in the range of about 15 to about 50 microns, wherein during the later stage of the refining step the applied shear is in the range of about 200,000 to about 1,000,000 $sec^{-1}$; and (c) subjecting the refined chocolate mixture to conching to produce chocolate. Still other objects and advantages of the present invention will become apparent to one of ordinary skill in the art upon a consideration of the present specification.

BRIEF DESCRIPTION OF THE DRAWINGS

FIG. 3 illustrates the experimental results obtained in the Example using a 5-roll refiner operated at different shear levels and flowrates. Curve A represents a typical or representative curve for a conventional chocolate process. Curves B and C represent the present inventive process using high shear between the next-to-last and last rollers.

DETAILED DESCRIPTION OF THE INVENTION

Figure 1:
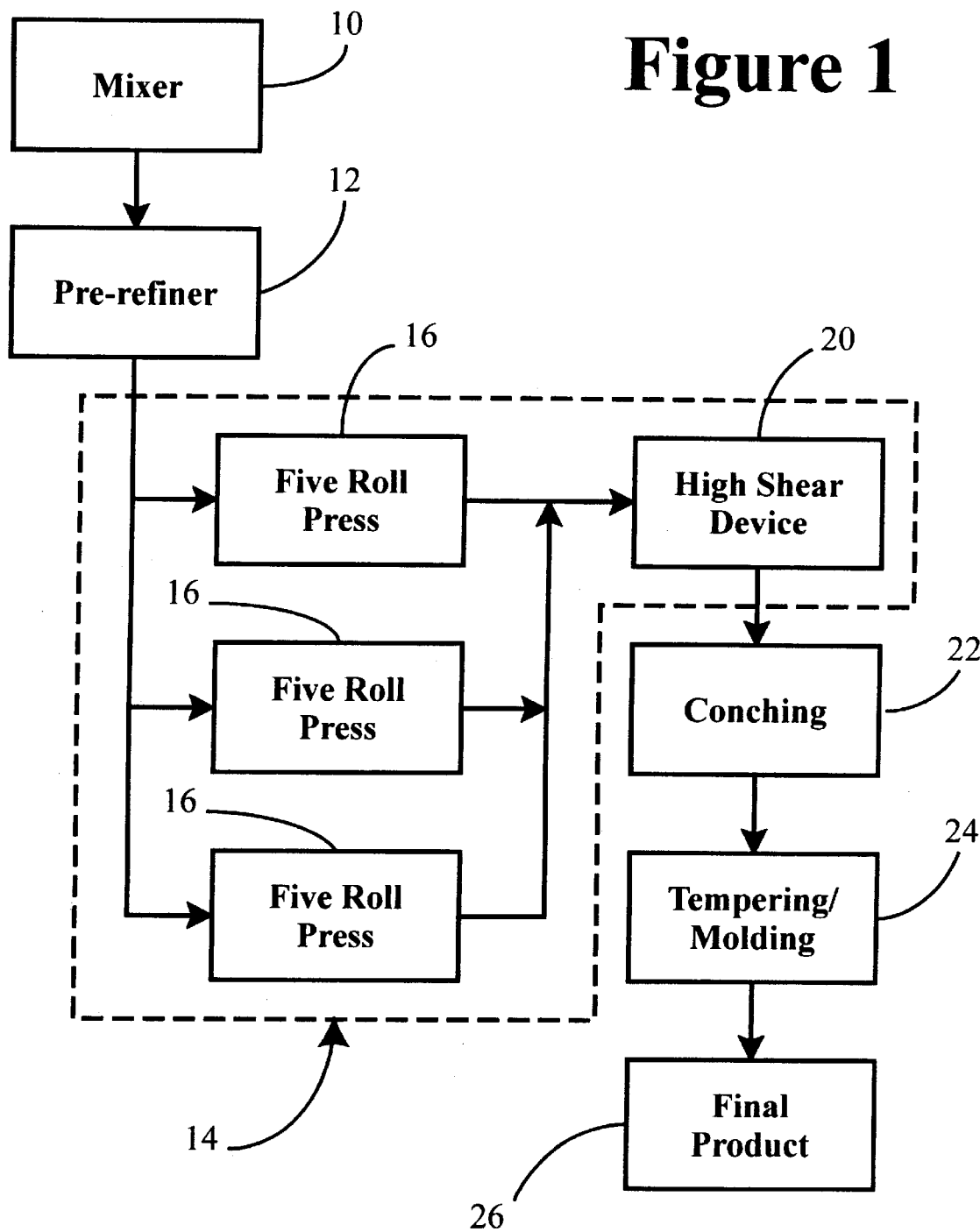
FIG. 1 is a flow diagram illustrating one embodiment of the present invention wherein the high shear is applied in a separate stage between the initial refining step and the conching step.

The present invention is directed to an improved chocolate-making process. The present process allows the chocolate refining step to proceed at a significantly increased throughput rate while maintaining the particle size distribution at the desired level. Thus, using the methods of this invention, the production rates of existing or newly designed chocolate-making processes can be increased significantly.

In the present invention, high shear is applied to the chocolate mass during the later stages of refining and before conching. Generally, this high shear is in the range of about 200,000 to about 1,000,000 $sec^{-1}$, preferably in the range of about 250,000 to about 700,000 $sec^{-1}$, and most preferably in the range of about 300,000 to about 600,000 $sec^{-1}$. For existing chocolate-making process lines, this high shear is most conveniently and preferably applied in the second-to-last or last roller in the multiple roll refiner. Thus, for example, the gears and/or operating conditions of a five-roll refiner could be adjusted so that much of such high shear is applied between the fourth and fifth rollers. Although such a modified multiple-roll system could be used in newly designed and/or constructed facilities, it may be preferable in such new installations to add an additional stage or step between the refining and conching steps specifically for applying the high shear to the chocolate mixture. Of course, if desired, such an additional stage or step could be added to an existing chocolate-making process. By sign significantly increasing the shear rate in the later stages of the refining process, the throughput of refining process, and thus the overall process, can be significantly increased without significantly increasing the particle size of the chocolate mass entering the conching step.

The method of the present invention is not limited to the production of a chocolate product from any specific starting ingredients, but may be used with any ingredients normally employed in chocolate manufacture (e.g., cocoa powder, chocolate liquor, cocoa butter, and/or other vegetable fats, such as coconut oil and palm kernel oil, sugar and/or sugar replacer, lecithin, and the like). Likewise, the process is not limited to the production of any specific type of chocolate product, but is useful for the production of a variety of chocolate products, such as chocolate coatings, sweet chocolate, bittersweet chocolate, milk chocolate, enrobing chocolate, and the like.

In one embodiment of the present invention, the refining step of a multiple roll press (or other refining equipment) is adjusted to apply high shear in the later stages of the reining step. First, cocoa liquor is combined with the other ingredients. These other ingredients may include, for example, one or more of the following: sweetener (usually sucrose), milk powder, butter fat, cocoa butter, an emulsifier (usually lecithin), and the like. This mixture is then subjected to roll refining to reduce the particle size of the cocoa particles, sugar particles, and other solid ingredients (such as milk powder, if present). The grittiness/mouthfeel of the final chocolate product is dependent upon the size of the particles which are produced during the refining step. It is usually desirable to have very fine particles of about 15 to about 50 microns, preferably in the range of about 15 to about 40 microns, and most preferably about 15 to about 25 microns, for the chocolate mass entering the conching step. By increasing the applied shear in the later stages of the multiple roll press, desirable particle sizes and particle size distributions can be obtained in the refining process while significantly increasing the throughput of the process. The refined cocoa mixture is then combined with cocoa butter or other suitable confectionery fat, such as coconut oil or palm kernel oil prior, during or after liquification in the conching step. Some of the cocoa butter may be withheld until the end of the conching step. The emulsifier (usually lecithin) may also be added during the conching step. The conching step takes place in suitable commercial equipment at a temperature in the range of from about 50 to about 80° C.

Generally, the high shear applied during the later stages of roll refining is obtained by adjusting the gears and/or operating conditions of the multiple roll refiner. Preferably, the high shear is applied between the next-to-last and last rollers of the multiple roll refiner. In such a manner, the amount of material processed through the multiple roll refiner can be significantly increased without significantly changing the average particle size or distribution of the processed material. Generally the high shear applied during the later stages of roll refining can be increased by increasing the relative rotational speeds of the two roller which will apply high shear. Of course, increasing the relative rotational speeds of, for example, the last two rollers will increase the energy input to the chocolate mass between the two rollers and, therefore, the temperature at the chocolate/roller interface. Thus, it is desirable to provide additional heat transfer means to keep the temperature in the desired range (generally between about 20 to 70° C.). For example, a cooling medium could be circulated through one or more of the rollers (especially the last two rollers) and/or the internals of the rollers could be modified to provide more effective heat transfer. Of course, the desired or preferred temperature for each roll may be different. For example, for a typical 5 roll press, roll 1 is preferably about 15 to 32° C.; roll 2 is preferably about 31 to 38° C.; roll 3 is preferably about 35 to 45° C.; roll 4 is preferably about 48 to 68° C.; and roll 5 is preferably about 25 to 37° C.

In another embodiment of the present invention, an additional stage or step for applying high shear is added to the chocolate manufacturing process between the multiple roll refining and the conching steps. Thus, for example, a separate multiple roll press (usually having only two or three rollers) could be placed between the initial multiple roll press and the conching process. The high shear would be applied by the separate multiple roll press. Of course, other type mixing devices capable of applying such high shear could also be used between the initial multiple roll press and the conching process. For purpose of this invention, the initial multiple roll press and the separate multiple roll press (or other high shear device) are considered to be a part of the refining process. By applying high shear in the intermediate device (i.e., between the initial multiple roll press and the conching step), the gap between the rollers (especially between the next-to-last and last rollers) of the initial multiple roll press can be increased, thereby significantly increasing the overall throughput of the system. The chocolate mixture leaving the initial multiple roll press can have a larger particle size, as compared to a conventional system, since the particle size will be further reduced by the high shear device.

Figure 2:
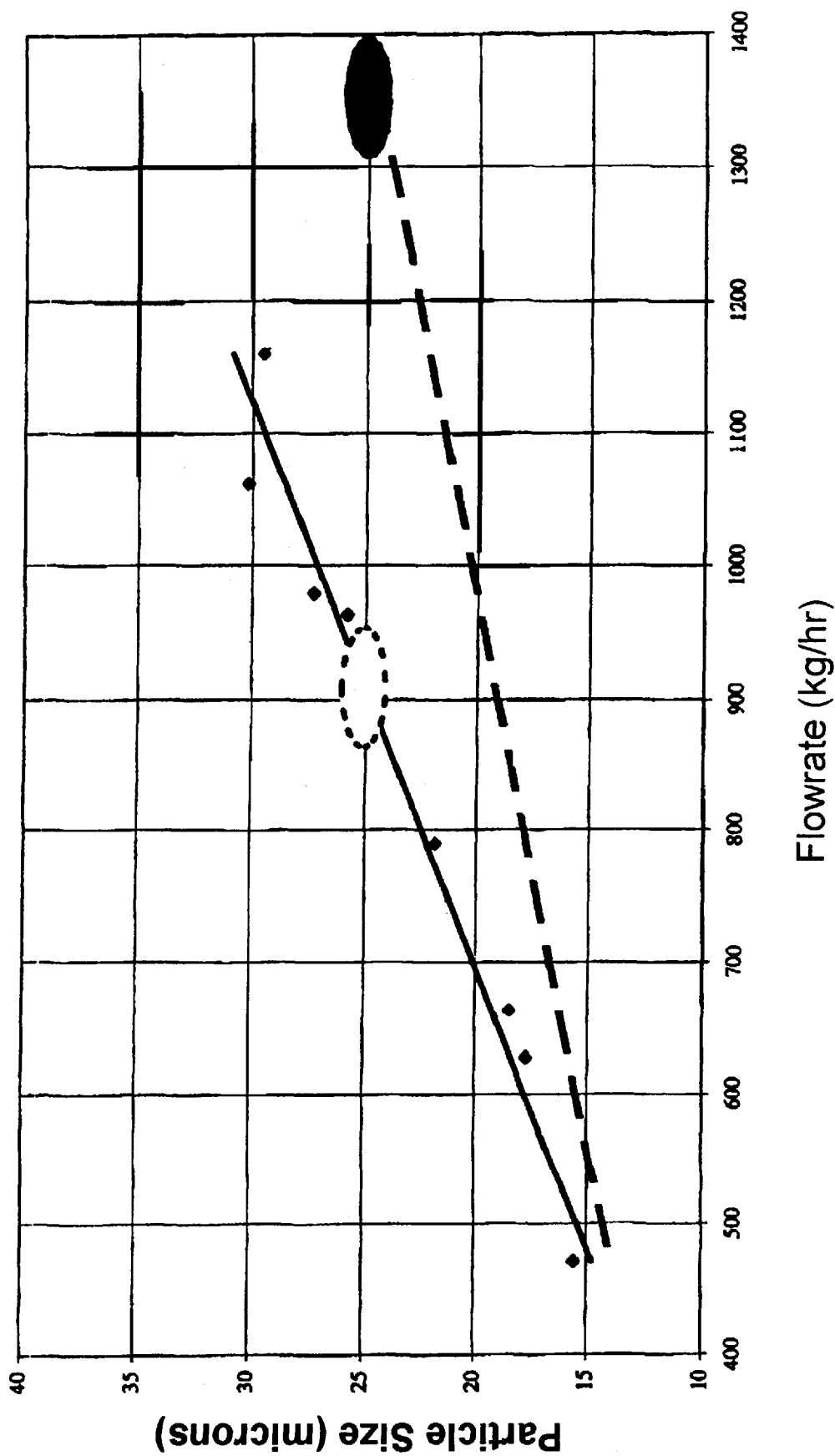
FIG. 2 illustrates the increased throughput provided by the method of this invention for a given target particle size. The solid curve is a typical or representative curve for a conventional chocolate process; the dashed oval represents conventional operational conditions required for a target particle size of about 25 microns. The dashed or lower curve is a typical or representative curve for the inventive process; the solid oval represents inventive operational conditions required for a target particle size of about 25 microns. For a target particle size of about 25 microns, the inventive process allows for about a 50 percent increase in throughput for the inventive process.

The use of an additional stage for applying the high shear is illustrated in FIG. 1. The chocolate ingredients are generally mixed together in mixer 10 and then further mixed in pre-refiner 12 (e.g., a two-roll press). The particle size of the mixture from pre-refiner 12 is generally greater than about 150 microns. The chocolate mass from pre-refiner 12 is then fed into refiner 14. As shown in FIG. 1, refiner 14 is composed of three separate five-roll presses 16 (i.e., initial stage) and high shear device 20 (later stage). Of course, different presses (e.g., three-roll presses) or different number of presses could be used if desired in the initial stage. The chocolate mass exiting the initial stage of refiner 14 generally has a particle size greater than about 50 microns. From initial stage of refiner 14, the chocolate mass enters the high shear stage or device 20 where the particle size is reduced to the final desired range (e.g., less than about 50 microns; preferably about 15 to about 50 microns; more preferably about 15 to about 40 microns; most preferably about 15 to 25 microns). From the high shear stage 20, the chocolate mass is conched in unit 22, tempered and/or molded in unit 24, and finally emerging as final product 26. Since it is relatively easy to reduce the particle size of the chocolate mass from about 150 microns to about 50 microns in the initial stage of refiner 14 and the final reduction in particle size occurs in the high shear stage 20, wherein significantly increased shear is applied to the chocolate mass to quickly and efficiently reduce the particle size to the desired range, the throughput in the refiner 14 can be substantially increased. Since the major bottleneck in chocolate manufacture is the refining step, the overall rate of chocolate production can be significantly increased. In pilot studies using a system similar to that shown in FIG. 1, the five-roll presses 16 were able to run at least twice their typical flowrates (relative to a system without high shear stage 20) and still achieve the desired overall particle size reduction. Thus, by use of the present invention, the overall production rate can be increased by at least 50 percent as illustrated in FIG. 2. In FIG. 2, using a typical five-roll system under convention operation conditions, a target particle size of about 25 microns can be obtained at a flowrate of about 900 kg/hr. Using a similar system wherein high shear is applied between the second-to-last and last rollers, the target particle size can be obtained at a flowrate of about 1350 kg/hr.

For newly designed systems (as illustrated in FIG. 1), the multiple roll presses in the initial stage of refiner 14 can, if desired, be two or three roll presses, thereby further reducing capital and operating costs. Of course, the high shear device 20 can also, if desired, be used with existing or newly designed five roll systems. Suitable high shear devices 20 include, for example, multiple roll presses and the like. Such high shear devices must be able to deliver the required high shear and achieve the desired average particle size and particle size distribution. Generally, the average particle size of the chocolate mixture exiting the initial multiple roll press will be in the range of about 100 to 275 microns. Thus, the high shear device must reduce the average particle size of such a mixture to the desired average particle size of about 15 to about 50 microns, preferably about 15 to about 40 microns, and most preferably about 15 to 25 microns. Even more preferably, the particle size of the chocolate mass from the high shear device is about 25 microns. Generally, it is preferred that at least 90 volume percent of the particles in the chocolate mixture are reduced to these sizes by the high shear device. Although other systems or techniques can be used to determine particle size distributions, a Malvern Laser Particle Size Analyzer is generally preferred.

The following example further illustrates the method of the invention, but is not intended to limit the scope of the invention as set forth in the appended claims.

Example. Chocolate masses having the following composition were prepared:

| Ingredient | Weight Percent |
|---|---|
| Cocoa Liquor | 13 |
| Crystallized Sugar | 47 |
| Cocoa Butter | 16 |
| Butter Fat | 5 |
| Milk Powder | 13 |
| Other | 6 |

After mixing the ingredients, the chocolate mass was pre-refined in a 2-roll refiner and then reduced to the final particle size in a 5-roll refiner using different flowrates and shear conditions between the fourth and fifth rollers. The particle size going into the 5-roll refiner was about 120 microns. The results are shown in FIG. 3 where the particle size is shown as a function of shear rate applied between the fourth and fifth rollers.

The dashed line (curve A) in FIG. 3 represents conventional 5-roll refiner performance. The two solid lines (curves B and C) in FIG. 3 represents operation at high shear (i.e., the present inventive process). Curve B illustrates the application of high shear using a flowrate of about 600 kg/hr; Curve C represents the application of high shear using a flowrate of about 450 kg/hr. It is expected, and confirmed in subsequent experiments not presented here, that similar curves can be obtained using the present inventive process at increased flowrates and that such curves are roughly or nearly parallel to the Curves B and C in FIG. 3. Moreover, Curve B remains essentially linear when extended to higher shear rates. Thus, a target particle size of, for example, 25 microns could be achieved at a flowrate of about 600 kg/hr using a shear rate in the range of about 350,000 to 400,000 $\sec^{-1}$.

What is claimed is:

1. A method for making chocolate, said method comprising:
   (a) providing a chocolate mixture comprising a chocolate source selected from the group consisting of cocoa powder and chocolate liquor, a fat source selected from the group consisting of cocoa butter and a vegetable fat, and a sweetener;
   (b) refining the chocolate mixture to obtain a particle size distribution such that at least about 90 volume percent of the particles of the chocolate mixture are in the range of about 15 to about 50 microns, wherein during the later stage of the refining step high shear is applied at a rate in the range of about 200,000 to about 1,000,000 sec$^{-1}$; and
   (c) subjecting the refined chocolate mixture to conching to produce chocolate.

2. A method in accordance with claim 1, wherein the refining step is carried out in one or more multiple roll presses and the high shear is applied between the next-to-last and last rollers in the one or more multiple roll presses.

3. A method in accordance with claim 2, wherein the refining the chocolate mixture is carried out until particle size distribution in the chocolate mixture is in the range of about 15 to about 40 microns and the high shear applied in the later stage of the refining step is applied at a rate in the range of about 250,000 to about 700,000 sec$^{-1}$.

4. A method in accordance with claim 3, wherein the high shear applied in the later stage of the refining step is applied at a rate in the range of about 300,000 to about 600,000 sec$^{-1}$.

5. A method in accordance with claim 1, wherein the refining step is carried out at a flow rate of between about 450 kg/hr and about 1350 kg/hr.

6. A method in accordance with claim 5, wherein the refining step is carried out at a flow rate of between about 450 kg/hr and about 600 kg/hr.

7. A method in accordance with claim 1, wherein the refining step is carried out using, in order, one or more first multiple roll presses and a separate high shear device and wherein the high shear is applied in the separate high shear device.

8. A method in accordance with claim 7, wherein the separate high shear device is a second multiple roll press.

9. A method in accordance with claim 8, wherein particle size distribution in the refined chocolate mixture is in the range of about 15 to about 40 microns and the high shear applied in the later stage of the refining step is applied at a rate in the range of about 250,000 to about 700,000 sec$^{-1}$.

10. A method in accordance with claim 9, wherein the high shear applied in the later stage of the refining step is in the range of about 300,000 to about 600,000 sec$^{-1}$.

11. A method in accordance with claim 7, wherein particle size distribution in the refined chocolate mixture is in the range of about 15 to about 40 microns and the high shear applied in the later stage of the refining step is applied at a rate in the range of about 250,000 to about 700,000 sec$^{-1}$.

12. A method in accordance with claim 11, wherein the high shear applied in the later stage of the refining step is applied at a rate in the range of about 300,000 to about 600,000 sec$^{-1}$.

* * * * *